(No Model.)
C. FAHLBERG.
APPARATUS FOR OBTAINING PHOSPHORUS TRICHLORIDE.
No. 381,685. Patented Apr. 24, 1888.
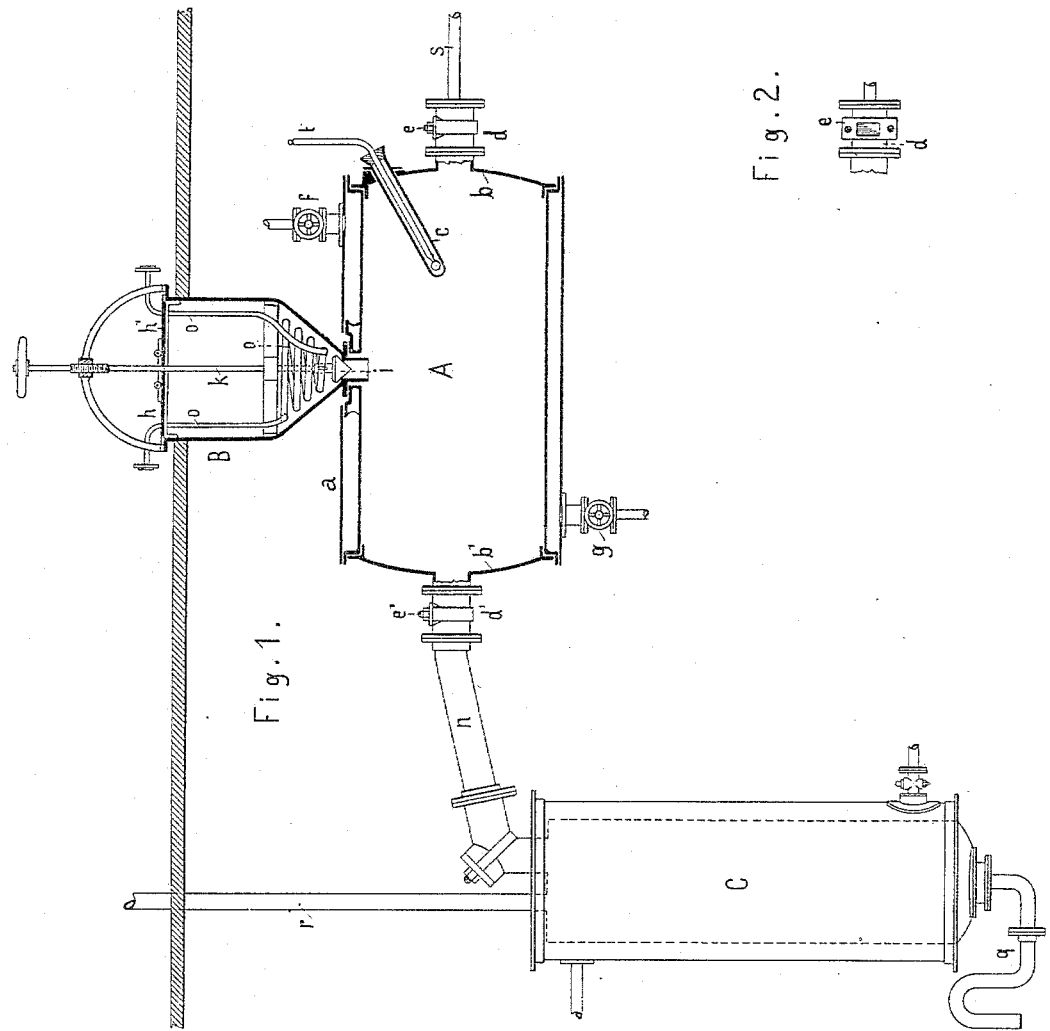

UNITED STATES PATENT OFFICE.

CONSTANTIN FAHLBERG, OF SELBKE-WESTERHÜSEN, PRUSSIA, GERMANY, ASSIGNOR TO FAHLBERG, LIST & CO., OF SAME PLACE.

APPARATUS FOR OBTAINING PHOSPHORUS TRICHLORIDE.

SPECIFICATION forming part of Letters Patent No. 381,685, dated April 24, 1888.

Application filed December 2, 1887. Serial No. 256,753. (No model.)

*To all whom it may concern:*

Be it known that I, CONSTANTIN FAHLBERG, doctor of philosophy, a citizen of the United States, residing at Selbke-Westerhüsen, Kingdom of Prussia, Germany, have invented new and useful Improvements in Apparatus for the Production of Phosphorus Trichloride, whereof the following is a specification.

The process of producing phosphorus trichloride, which consists in causing gaseous chlorine to act on phosphorus, has heretofore always been carried out in vessels of glass or earthenware, metallic vessels having been avoided on account of the corrosive action of chlorine on metals. The said glass or earthenware vessels, however, do not allow of producing the phosphorus trichloride otherwise than in small quantities, and their fragility is a constant source of danger. Besides, as it is unsafe to charge the said vessels with yellow phosphorus, red or amorphous phosphorus has only been used, whereby the cost of the product is considerably increased.

My invention has for its object to produce phosphorus trichloride in metallic vessels and from yellow phosphorus without being exposed to the aforesaid inconveniences, and it is based on the discovery which I have made that metals are not attacked by chlorine when phosphorus is present in excess.

I carry out my invention by means of an apparatus consisting of a retort made of metal and having, preferably, the form of a horizontal cylinder, the said retort being surrounded by a steam-jacket and connected at one end to the supply-pipe for dry chlorine gas, at the other end to a refrigerator, in which the vapors of phosphorus trichloride are condensed, and at the top to a vessel from which yellow phosphorus is supplied in liquid state. The latter vessel is provided with a steam-heating coil for melting the phosphorus, and at its bottom there is a valve fitted with means for adjusting the same, and whereby the flow of phosphorus to the retort is regulated. Into the retort is inserted a thermometer, and at either end of the same, or on the pipes connected therewith, are arranged sight-glasses.

On the annexed sheet of drawings this apparatus is shown by Figure 1 in sectional elevation, while Fig. 2 represents a part thereof in plan.

A is the retort, made of metal—for instance, of iron, copper, phosphorus-bronze, or brass—and $a$ the steam-jacket surrounding the same, and which is supplied with steam by the pipe $f$, while the water of condensation is discharged at $g$.

$s$ is the pipe through which the chlorine gas is introduced into the retort; C, the refrigerator, connected to the retort by the pipe $n$, and B the vessel from which the phosphorus is supplied.

$o$ is the steam heating coil, arranged within the latter, and $i$ the valve by which the flow of phosphorus to the retort is controlled, the said valve being fitted with the regulating-screw $k$.

$h$ and $h'$ are two hinged lids for closing the vessel.

$t$ is the thermometer. $c$ is a tube serving to protect the same, and $e\ e'$ are the sight-glasses, which in the apparatus shown by the drawings are inserted into the top of the tubular pieces $d\ d'$, forming portions of the respective pipes $s$ and $n$, and one of which is shown in plan by Fig. 2.

The refrigerator is preferably made of cylindrical shape in view of facilitating the cleaning of the same, and it is provided with a jacket through which water is caused to flow, as in other like apparatuses of this kind.

$q$ is a siphon-pipe for the outflow of the product obtained, and $r$ a pipe for the issue of uncondensed vapors.

The vessel B and the refrigerator C may both be constructed of any suitable metal; but the latter is with advantage coated with lead inside. The valve $i$ is preferably made of asbestus.

The mode of working with the apparatus is as follows: The vessel B is filled to about one half with water and then charged with yellow phosphorus. Steam is thereupon admitted to the coil $o$ and the jacket $a$, and after the phosphorus has been melted a portion thereof is allowed to run into the retort. Subsequently the chlorine gas, produced, purified, and dried by any known means, is conducted into the same. The temperature within the retort, which rises from the action of the chlorine on the phosphorus, is then regulated according to the indications of the thermometer *t* by suitably checking or increasing the influx of the chlorine and by shutting off the steam from the steam-jacket *a* or turning it on, while the process is controlled in respect to the admission of phosphorus according to the color of the vapors visible through the sight-glasses *e e'*, the said colors varying as there is an excess of phosphorus or of chlorine present in the retort. The phosphorus trichloride condensed in the refrigerator C continuously flows off through the pipe *q* and is collected in vessels of glass or earthenware.

I claim as my invention—

1. In an apparatus for the production of phosphorus trichloride, the combination, with each other, of a retort made of metal, a steam-jacket surrounding the same, a vessel for melting phosphorus, a valve for controlling the flow of phosphorus from the said vessel to the retort, a pipe for admitting chlorine to the retort, a refrigerator for condensing the vapors of phosphorus trichloride produced, sight-glasses through which the contents of the retort can be examined, and a thermometer inserted into the retort, substantially as hereinbefore described.

2. In an apparatus for the production of phosphorus trichloride, the combination, with each other, of the retort A, made of metal, the steam-jacket *a*, the vessel B, communicating with the top of the retort and provided with the steam-heating coil *o*, valve *i*, and regulating-screw *k*, the chlorine-supply pipe *s*, the refrigerator C, connected to the retort by the pipe *n*, sight-glasses *e e'*, and thermometer *t*, substantially as specified.

In testimony whereof I have hereunto set my hand in the presence of two subscribing witnesses.

CONSTANTIN FAHLBERG.

Witnesses:
W. WENGHÖFER,
JUL. NIESCHALK.